UNITED STATES PATENT OFFICE.

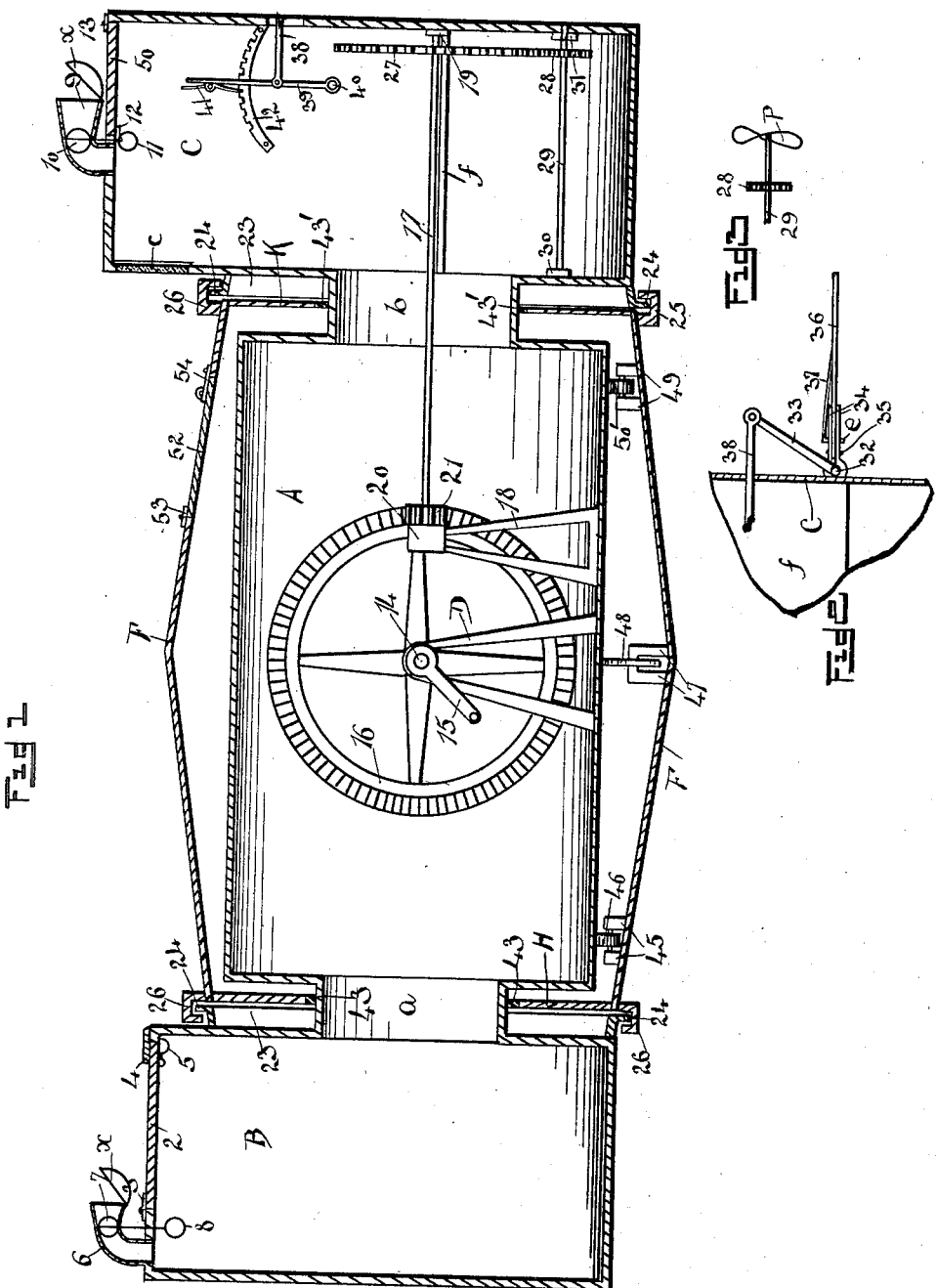

AUGUST BAUMGART, OF CORNLEA, NEBRASKA.

LIFE-BOAT.

SPECIFICATION forming part of Letters Patent No. 701,128, dated May 27, 1902.

Application filed June 4, 1901. Serial No. 63,164. (No model.)

*To all whom it may concern:*

Be it known that I, AUGUST BAUMGART, a citizen of the United States, residing at Cornlea, Platte county, Nebraska, have invented a Life-Saving Boat, of which the following is a specification.

This invention relates to an improvement in life-saving boats.

The object of my invention is to provide a life-boat so constructed that the wash and force of waves shall be compensated in striking my life-boat, so that the force of the waves and water will expend its force upon an outer movable covering to protect the life-boat proper.

In the accompanying drawings I have shown in Figure 1 a central sectional view of a life-boat embodying my invention with portions broken away, while Fig. 2 shows a top view of a broken portion of my life-boat, disclosing the steering mechanism, while Fig. 3 discloses a broken detail of the propeller.

My invention embodies a life-boat comprising a main approximately cylindrical chamber A, a forward bow-chamber B, and a rear or shallow chamber C. These three chambers are connected, the first and second by means of the narrow communication in the form of a collar $a$, and the small circular annular section $b$ providing a communication between the chambers A and C. These communications $a$ and $b$ are in the form of collars or cylinders and may form an integral portion or be secured to the chambers, which they connect by any suitable means. The forward chamber B is provided above and upon the top with a suitable door 2, secured by means of a hinge 3, and may be provided with a cleat 4 to form a water-tight union. Below the door is closed by means of a suitable latch. Entering the forward chamber B is a tube 6 to provide fresh air, which is closed by means of a suitable valve 7, operated from below by a handle 8. Upon the outside this tube 6 is further provided with a lid $x$, adapted to be raised by the wash of the water should it rise that high to close this fresh-air communication 6. The rear chamber C is provided with one of these fresh-air tubes 9, within which is held a valve 10, provided with the operating-handle 11, as shown. This rear chamber C may be entered through a suitable door 50, held by the hinge 13, closed by the latch 12. This rear fresh-air pipe 9 is also provided with one of the lids $x$, provided with a round top.

Held within a suitable frame D within the main chamber A is a shaft 14, operated by the crank 15, and this shaft supports a crown-gear 16, which crown-gear meshes with a pinion 21, secured to the shaft 17, which shaft works at its forward end within the standard 18 and within the bearing 19 within the chamber C. This shaft 17 is provided with a large gear 27, meshing with a small gear 28, secured to the shaft 29, to which shaft is secured a suitable propeller, and which shaft is held within the bearings 30 and 31.

Secured to the rear chamber C is a vertical shaft 32, provided with an extension 33, to which extension is secured the connecting-rod 38, which rod is in turn secured to the lever 39, pivoted by means of a pin 40, as shown. This lever 39 is provided with a suitable keeper 41, adapted to work into the sector 42, so that the rudder 36, which is secured to the shaft 32, may be locked in any suitable position. This rudder 36 is held upon a pivot 35, which pivot passes through the bracket 34, secured to the shaft 32. The rudder 36 may be held in a horizontal or an upright position in being locked by means of a spring-ear 37.

The forward chamber B and the rear chamber C are each provided with a projecting ring 23, having an outwardly-extending flange 24, as shown. Revolubly working and upon the cylindrical collar-sections $a$ and $b$ are the disks H and K, which are provided with the stuffing-boxes 43 and 43', so as to insure a water-tight connection between the portions $a$ and $b$. Connecting these disks H and K is an approximately barrel-shaped housing F, which is provided with a door 52, held by the hinge 53 and the keeper 54. This housing F forms an exterior air-chamber surrounding the interior chamber. This chamber F is permitted to revolve freely with the wash of the water or the movement of the waves, so that the shock of the waves is expended upon the housing F, which revolves in obedience to the wave-power. To prevent longitudinal movement of the housing F are provided the rings 23 23 and the hooks 26, which work over the flanges 24 of the rings 23. This buoyant air-chamber F is provided below with a plurality of bearings 45, 47, and 49, supporting the collars 46, 48, and 50', upon which rest the interior chamber A.

Suitable ladders may be provided upon the exterior, as may also life-lines and light to offer a means of saving such as might come within grasp of the life-line.

The rear chamber C is provided with a suitable window c, at which the pilot places himself.

This boat may be made of any suitable length and height, though it is thought that the chamber H should be made of such a height that a tall man could conveniently stand upright in the same.

To enter the chamber A, the passenger would of course have to crawl through the cylindrical chambers a and b, which form the bearings upon which the outer housing F revolves.

While the propeller-shafts are shown as being adapted to be operated by manual power, it is of course understood that a gasolene-engine or any other suitable motor-power could be employed.

I do not wish to confine myself to any specified shape as regards the chambers A, B, C, or F, as the design of these chambers may be varied without departing from the spirit of my invention.

Having thus described my said invention, what I claim as new, and desire to secure by United States Letters Patent, is—

The combination in a boat of the character described of a main central chamber, a forward chamber, a narrow cylindrical communication between said forward and said main chambers, a rear chamber, a narrow cylindrical communication between said rear and said main chambers, a housing surrounding said main chamber provided with end disks working upon said cylindrical communication to form an air-chamber surrounding said main chamber, said housing and said disks being revolubly supported and held as and for the purpose set forth.

AUGUST BAUMGART.

Witnesses:
R. P. DRAKE,
G. H. PETERS.